United States Patent
Ikuno et al.

(10) Patent No.: US 8,148,453 B2
(45) Date of Patent: Apr. 3, 2012

(54) RESIN COMPOSITION AND MOLDED PRODUCT

(75) Inventors: Masaya Ikuno, Kanagawa (JP); Masayuki Okoshi, Kanagawa (JP); Kenji Yao, Kanagawa (JP); Masahiro Moriyama, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 12/869,080

(22) Filed: Aug. 26, 2010

(65) Prior Publication Data
US 2011/0218278 A1    Sep. 8, 2011

(30) Foreign Application Priority Data
Mar. 2, 2010   (JP) ................................. 2010-045840

(51) Int. Cl.
*C08K 5/5399* (2006.01)
(52) U.S. Cl. ........................................................ 524/138
(58) Field of Classification Search .................... 524/138
See application file for complete search history.

(56) References Cited

U.S. PATENT DOCUMENTS

| | | | |
|---|---|---|---|
| 2006/0270779 A1* | 11/2006 | Mochizuki et al. | 524/500 |
| 2006/0276582 A1* | 12/2006 | Mochizuki et al. | 524/537 |
| 2008/0234412 A1* | 9/2008 | Yamamoto et al. | 524/86 |
| 2008/0262151 A1* | 10/2008 | Ishii et al. | 524/599 |
| 2010/0174017 A1* | 7/2010 | Tobita et al. | 524/192 |
| 2010/0197842 A1* | 8/2010 | Kamikawa | 524/195 |

FOREIGN PATENT DOCUMENTS

| | | |
|---|---|---|
| JP | A-2005-281465 | 10/2005 |
| JP | A-2006-152112 | 6/2006 |
| JP | A-2007-308660 | 11/2007 |
| JP | A-2010-144084 | 7/2010 |
| WO | WO 2009/041054 A1 * | 4/2009 |

OTHER PUBLICATIONS

Jun. 16, 2011 European Search Report issued in EP 10 17 6740.8.

* cited by examiner

*Primary Examiner* — Peter Szekely
(74) *Attorney, Agent, or Firm* — Oliff & Berridge, PLC

(57) ABSTRACT

A resin composition containing at least (A) a polylactic acid, (B) a phosphazene compound, and (C) a rubber and/or thermoplastic elastomer.

17 Claims, No Drawings

RESIN COMPOSITION AND MOLDED PRODUCT

CROSS-REFERENCE TO RELATED APPLICATION(S)

The present application claims priority from Japanese Patent Application No. 2010-045840 filed on Mar. 2, 2010, the entire content of which is incorporated herein by reference.

BACKGROUND

1. Field

The present invention relates to a resin composition and a molded product.

2. Description of the Related Art

Heretofore, a polymer material such as a polystyrene, a polystyrene-ABS resin copolymer, a polycarbonate, a polyester, a polyphenylene sulfide, and a polyacetal have been used for components of electric products and electronic and electric equipments since they are excellent in heat resistance and mechanical strength and, particularly, in the retainability of the mechanical strength against circumstantial changes in a case of the components of the electronic and electric equipments.

SUMMARY

According to an aspect of the invention, there is provided a resin composition containing at least (A) a polylactic acid, (B) a phosphazene compound, and (C) a rubber and/or thermoplastic elastomer.

DETAILED DESCRIPTION OF EXEMPLARY EMBODIMENTS

Embodiments of a resin composition and a molded product in the invention are to be described below. Each of the embodiments is an example for carrying out the invention and the invention is not restricted to the embodiment.

[Resin Composition]

A resin composition in this embodiment contains at least (A) a polylactic acid, (B) a phosphazene compound, and (C) a rubber and/or thermoplastic elastomer.

Generally, in a resin composition formed by mixing a lactic acid type resin, a phosphazene type compound, and a thermoplastic resin, the wet heat resistance tends to be deteriorated by the effect of hydrolysis. Further, in a case of providing a phosphoric or inorganic hydroxide type flame retardant to the polylactic acid, the wet heat resistance and the impact resistance tend to be deteriorated.

The resin composition of this embodiment has been achieved as a result of a study for the improvement of the hydrolyzability of the polylactic acid, a high impact resistance has been attained while maintaining wet heat resistance in a resin material containing the polylactic acid as a main raw material, which was difficult to be obtained in the prior art. Although the reason has not yet been apparent, it is considered to be attributable to that the phosphazene compound functions as a binder for the polylactic acid and the rubber and/or the thermoplastic elastomer, so that peeling at the boundary between the polylactic acid and the rubber and/or thermoplastic elastomer is decreased.

<Polylactic Acid>

The polylactic acids are derived from plants and have an effect of decreasing environmental loads, specifically, decreasing $CO_2$ emissions and decreasing the amount of petroleum to be used. The polylactic acids have no particular restriction so long as they are condensates of lactic acids and may be poly-L-lactic acids (hereinafter also referred to as "PLLA"), poly-D-lactic acids (hereinafter also referred to as "PDLA"), or mixtures of PLLA and PDLA by copolymerization or blending. Further, the polylactic acids may be stereo complex type polylactic acids having highly heat resistance, in which helical structures thereof are combined effectively (hereinafter also referred to as "SC-PLA"). Further, as to the polylactic acids, synthesized products or commercial products may be used. The commercial products include, for example, "TERRAMAC TE4000", "TERRAMAC TE2000", and "TERRAMAC TE7000") manufactured by Unitika Ltd. and "LACEA H100" manufactured by Mitsui Chemicals Inc. The polylactic acids may be used each alone or two or more in combination. In this embodiment, the polylactic acid is contained as a main component of the resin composition. "Main component" means herein that it exceeds 50 mass % based on the entire amount of the resin composition.

The molecular weight of the polylactic acid is not particularly restricted and, in this embodiment, the weight-average molecular weight of the polylactic acid is 8,000 or more and 200,000 or less and, preferably, 15,000 or more and 120,000 or less. In a case where the weight-average molecular weight of the polylactic acid is less than 8,000, the combustion speed of the resin composition increases and the mechanical strength at low temperature tends to be lowered. On the other hand, in a case where the weight-average molecular weight of the polylactic acid exceeds 200,000, soft and flexibility are lowered and the self-extinction by dripping of the resin composition is deteriorated. The flame retardancy tends to be lowered in each of the cases. "Self-extinction by dripping" means that the resin composition is dripped by the heat and disappears.

The weight-average molecular weight of the polylactic acid in the resin composition means a weight-average molecular weight obtained by cooling the resin composition in a liquid nitrogen atmosphere, scraping off a specimen for measurement from the surface thereof, dissolving the specimen for measurement at a concentration of 0.1 mass % in deuterated chloroform and measuring the separated polylactic acid by gel permeation chromatography. Further, for measurement, "HLC-8220GPC" manufactured by Tosoh Corporation is used as a gel permeation chromatograph.

<Phosphazene Compound>

The phosphazene compound used in this embodiment is an organic compound having "—P=N— bond" in the molecule, and a cyclic phenoxy phosphazene, a linear phenoxy phosphazene, and a phenoxy phosphazene are used preferably. Among them, the cyclic phenoxy phosphazene is preferred with a view point of wet heat resistance. The cyclic phenoxy phosphazene includes as commercially available products, for example, "FP-100", "FP-110", and "FP-200" (trade name of products manufactured by Fushimi Pharmaceutical Co., Ltd.), and "SP-100" and "SP-100H" (trade name of products manufactured by Otsuka Chemical Co., Ltd.).

The content of the phosphazene compound in the resin composition of this embodiment is 5 parts or more and 100 parts or less and, preferably, 10 parts or more and 50 parts or less based on 100 parts of the polylactic acid. In a case where the content of the phosphazene compound is less than 5 parts based on 100 parts of the polylactic acid, the impact resistance is poor. In a case where the content of the phosphazene compounds exceeds 100 parts based on 100 parts of the polylactic acid, the moldability is worsened by bleed out.

<Rubber, Thermoplastic Elastomer>

The rubber and/or thermoplastic elastomer in this embodiment include, for example, a silicone-acryl blend rubber, an acryl rubber, a butadiene rubber, and a natural rubber. Among them, a core-shell type rubber has a double structure composed of a core and a shell. The core portion is in a soft rubber state, the shell portion on the surface is in a rigid resin state and a rubber per se in a powder (particle) state is an elastomer. In the core-shell rubber, most of the portions of the particle thereof maintains an original form even after it is melt kneaded, for example, with a polylactic acid resin. Since most of the portions of the blended rubber maintains the original form, dispersibility in the polylactic acid composition is good and peeling less occurs at the surface layer.

Commercially available core-shell rubber includes, for example, "METABLEN SX-005", "METABLEN SRK-200", "METABLEN W600A", and "METABLEN C-223A" (trade name of products manufactured by Mitsubishi Rayon Co. Ltd., "MR-01", and "MR-02" (trade name of products manufactured by Kaneka Corporation), "PARALOID EXL-2603" (trade name of products manufactured by Kureha Corporation), "HIBLEN-B621" (trade name of products manufactured by Zeon Corporation), and "PARALOID KM330" (trade name of products manufactured by Rohm & Haas).

For example, "METABLEN SX-005", "METABLEN SRK-200", "METABLEN S201", and "METABLEN C-223A" have a core-shell structure having a graft layer at the outside of particulate rubber, "METABLEN SRK200" and "METABEN-2001" have a core containing a butadiene type rubber and a graft layer containing a polycarbonate (PC), a polybutylene terephthalate (PBT), a polyamide (PA), a polyethylene terephthalate (PET), a polystyrene (PS), a vinyl chloride resin (PVC), an ABS resin (ABS), and an acryl resin (MMA), and "METABLEN SX-005" has the core as described above and, a graft layer further containing polypropylene (PP) and polyethylene (PE). "METABLEN C-223A" has a core containing a silicone-acryl blend rubber and a graft layer containing PC, PBT, PA, PS. and PVC.

The content of the rubber and/or thermoplastic elastomer in the resin composition in this embodiment is 0.1 parts or more and 20 parts or less and, preferably, 1 part or more and 10 parts or less based on 100 parts of the polylactic acid. In a case where the content of the rubber and/or thermoplastic elastomer is less than 0.1 part based on 100 parts of the polylactic acid, the impact resistance is poor. On the other hand, where the content of the rubber and/or thermoplastic elastomer exceeds 20 parts based on 100 parts of the polylactic acid, the heat resistance and the flame retardancy are deteriorated.

<Polyfunctional Compound>

The polyfunctional compounds used in this embodiment are compounds having two or more functional groups reacting with a terminal group of the polylactic acid (for example, carboxyl group, hydroxide group, etc.).

The polyfunctional compounds having functional groups reacting with the terminal group of the polylactic acid include, for example, a carbodiimide compound, a dicarboxylic acid compound, a diol compound, a hydroxyl carboxylic acid compound, an epoxy compound, etc. The carbodiimide compound includes, for example, an aliphatic monodicarbodiimide, an aliphatic diacarbodiimide, an aromatic monocarbodiimide, an aromatic dicarbodiimide, etc.

The dicarboxylic acid compound includes, for example, a succinic acid, an adipic acid, and a sebacic acid.

The diol compound includes, for example, an ethylene glycol, a propylene glycol, and a bisphenol A.

The hydroxyl carboxylic acid compound includes, for example, a lactic acid, a 3-hydroxy butyric acid, a 6-hydroxy hexanoic acid, etc.

The epoxy compound includes, for example, a bisphenol type epoxy, and a novolac type epoxy.

Among them, the polyfunctional compound is preferably a bifunctional compound (a polyfunctional compound having two functional groups) and, particularly preferably, a bifunctional carbodiimide compound.

The polyfunctional compound may be used each alone or two or more of them may be used in combination.

The carbodiimide compound described above is a compound having two or more functional groups reacting with the terminal groups of a polylactic acid (for example, a carboxyl group, a hydroxyl group, etc.), which is a compound having a carbodiimide group represented by "—N=C—N—" in the molecule. The carbodiimide compound includes, for example, an aliphatic monocarbodiimide, an aliphatic dicarbodiimide, an aromatic monocarbodiimide, an aromatic dicarbodiimide, etc. Among them, bifunctional a compound (a polyfunctional compound having two functional groups), particularly, a bifunctional carbodiimide compound are preferred. The carbodiimide compound may be used each alone or two or more of them may be used in combination. They include, for example, "CARBODILITE" manufactured by Nisshinbo Chemical Inc. (trade name of products).

The content of the polyfunctional compound in the resin composition of this embodiment (total content in a case of using two or more of the compounds in combination) is 0.1 parts or more and 10 parts or less and, preferably, 1 part or more and 5 parts or less based on 100 parts of the polylactic acid. In a case where the content of the polyfunctional compound is less than 0.1 parts based on 100 parts of the polylactic acid, the wet heat resistance is poor. On the other hand, in a case where the content of the polyfunctional compound exceeds 10 parts based on 100 parts of the polylactic acid, the kneading property is poor.

<Other Components>

The resin composition in this embodiment may also contain an antioxidant, a stabilizer, an UV-absorbent, a flame retardant, and a filler.

The antioxidant includes, for example, phenol type, amine type, phosphoric type, sulfur type, hydroquinone type, and quinoline type antioxidants.

The stabilizer includes, for example, a nitrogen-containing compound such as a basic nitrogen-containing compound, for example, a polyamide, a poly-β-alanine copolymer, a polyacrylamide, a polyurethane, a melamine, a cyanoguanidine, and melamine-formaldehyde condensation products; an alkali or alkaline earth metal-containing compound such as an organic carboxylic acid metal salt (a calcium stearate, a calcium 12-hydroxystearate, etc.), a metal oxide (a magnesium oxide, a calcium oxide, an aluminum oxide, etc.), a metal hydroxide (a magnesium hydroxide, a calcium hydroxide, an aluminum hydroxide, etc.), and a metal carbonate; a zeolite; a hydrotalcite, etc.

The UV-ray absorbent includes a benzophenone type, a benzotriazole type, a cyanoacrylate type, a salicylate type and an oxalic acid anilide type, etc.

The resin composition according to this embodiment may also contain other flame retardants unless deteriorating the impact resistance. Other flame retardants include a silicone type flame retardant, a nitrogen type flame retardant, and an inorganic hydroxide type flame retardant. Further, the flame retardant may be used each alone or two of them in combination.

Further, as the flame retardant, a synthesized product or a commercial product may be used. A phosphoric type commercial flame retardant product includes "PX-200" and "X-202" manufactured by Daihachi Chemical Industry Co. Ltd., "TERRAJU C80" manufactured by BUDENHEIM and "EXOLIT AP422" and "EXOLIT OP930" manufactured by Clariant. A commercial silicone type flame retardant product includes, for example, "DC4-7081" manufactured by Dow Corning Toray Co. Ltd. A commercial nitrogen type flame retardant product includes, "APINONE 901" manufactured by SANWA CHEMICAL Co., Ltd., "Melamine pyrophosphate" manufactured by Shimonoseki Mitsui Chemicals Inc., and "FP2100" manufactured by ADEKA Corporation. An inorganic hydroxide type commercial flame retardant product includes, for example, "MGZ300" manufactured by SAKAI CHEMICAL INDUSTRY Co. Ltd., and "B103ST" manufactured by Nippon Light Metal COMPANY. Ltd.

Further, the filler includes, for example, clay such as a kaolin, a bentonite, kibushi clay, and gaerome clay, a talc, a mica, a montmorillonite, etc. Further, other fillers include a melamine-containing particle, a phosphate particle, a titanium oxide, etc. Further, the other fillers may be used each alone or two or more of them in combination. Further, a polylactic acid previously added to clay, for example, "TERRAMAC TE7000" manufactured by UNITIKA Ltd. may also be used.

The resin composition in this embodiment may also contain resins other than the polylactic acid, a release agent, a weather proofing agent, a light fastness agent, a colorant, etc.

<Preparation Method of Resin Composition>

The resin composition in this embodiment is manufactured by kneading (A) a polylactic acid, (B) a phosphazene compound, (C) a rubber and/or thermoplastic elastomer, optionally, (D) a polyfunctional compound, and other components if necessary.

Kneading is performed by using known kneading apparatus such as a twin shafts kneader (TEM58SS, manufactured by Toshiba Machine Co., Ltd.), and a simple kneader (LABO-PLASTOMILL, manufactured by Toyo Seiki Seisaku-sho Ltd.

[Mold Product]

The molded product in this embodiment can be obtained by molding the resin composition in this embodiment described above. For example, the molded product according to this embodiment is obtained by molding by a molding method such as injection molding, extrusion molding, blow molding, and hot press molding. In this embodiment, those obtained by injection molding the resin composition of this embodiment are preferred due to the reason of dispersibility of the ingredients in the molded products.

Injection molding is performed by using commercial apparatus such as "NEX150" manufactured by Nissei Plastic Industrial Co., Ltd., "NEX70000" manufactured by Nissei Plastic Industrial Co., Ltd. and "SE50D" manufactured by Toshiba Machine Co., Ltd., etc. In this case, the cylinder temperature is 160° C. or higher and 240° C. or lower and, more preferably, 170° C. or higher and 210° C. or lower with a view point of suppressing the decomposition of the polylactic acid. Further, the die temperature is preferably 30° C. or higher and 120° C. or lower and, more preferably, 30° C. or higher and 60° C. or lower with a view point of productivity.

<Components for Electronic and Electric Equipments>

The molded product in this embodiment described above can be used suitably to the application use, for example, of electronic and electric equipments, home use products, containers, and automobile interior materials since they can be excellent in the mechanical strength (impact resistance), wet heat resistance, and flame retardancy. More specifically, they are used for casings, various kinds of components, wrapping films, etc. for home use electric products and electronic and electric equipments, containment cases for CD-ROM or DVD, table wares, trays for foods, beverage bottles, and drug wrapping materials. Among them, they are suitable to components for electronic and electric equipments. Since most of components for electronic and electric equipments have complicate shapes and they are heavy weight products, high impact strength and surface impact strength are required and the resin molded product of this embodiment can sufficiently satisfy such requires properties.

Example

The present invention is to be described specifically with reference to examples and comparative examples but the invention is not restricted to the following examples.

Example 1 to Example 13

Compositions shown in Example 1 to Example 13 shown in Table 1 were kneaded by a twin shafts kneader (TEM58SS, manufactured by Toshiba Machine Co., Ltd.) at a cylinder temperature of 190° C. to obtain resin composition pellets. The obtained pellets were molded by an injection molding machine ("NEX 150" manufactured by Nissei Plastic Industrial Co., Ltd.) at a cylinder temperature of 190° C. and at a die temperature of 100° C. to mold ISO multi-purpose dumbbell test specimens (corresponding to ISO 527 tensile test and ISO 178 bend test) (4 mm thickness, 10 mm width for the test portion).

Further, Table 2 shows commercial names and manufacturer's names for the abbreviation of each of the components shown in Table 1. B6 in Table 2 was synthesized by the following method.

Synthesis Example

Synthesis of Linear Phosphazene Compound (B6)

441 g (3.55 mol) of p-methoxyphenol was weighted in a 3 L flask equipped with a reflux cooler, a thermometer, and a stirrer, and THF (1.5 L) was added and stirred till they became uniform. And then, 74 g (3.2 g atoms) of metallic sodium was poured therein at a temperature of 50° C. or lower, the temperature rised up to 60° C. for one hour after the completion of pouring, and then they were stirred at 60° C. to 68° C. for 4 hours to obtain a THF solution of sodium p-methoxyphenolate.

Further, 401 g (4.26 mol) of phenol was weighted in a 3 L flask similar to that described above and THF (1.5 L) was added and dissolved. And then, 89 g (3.9 g atoms) of metallic sodium was poured therein at a temperature of 50° C. or lower, the temperature rised up to 60° C. for one hour after the completion of pouring, and then they ware stirred at 60° C. to 68° C. for 4 hours to obtain a THF solution of sodium phenolate.

Separately, a solution containing 75 g (0.65 mol) of dichlorophosphazene polymer described in Synthesis Example 1 dissolved in THF (750 mL), and 475 g (2.58 mol) of chlorobenzene solution containing dichlorophosphazene oligomer having many linear components (63% concentration, trimer: 36%, tetramer: 3%, pentamer and hexamer: 24%, heptamer: 7%, and octamer or higher monomer: 30%) were weighted in a 10 L flask and, further, the THF solution of sodium p-methoxyphenolate was dropped slowly while keeping at a temperature of 30° C. or lower. After dropping, they were stirred for one hour at 30° C. or lower and further stirred for 3 hours under reflux of the solvent (70° C.) after rising the temperature. The reaction solution was once cooled, the THF solution of the sodium phenolate was dropped slowly while keeping the temperature at 30° C. or lower, and they were stirred for one hour after the dropping at 30° C. or lower, and they were stirred for one hour after the dropping at 30° C. or lower, and further stirred for 10 hours under reflux of the solvent (70° C.) after rising the temperature.

After completion of the reaction, they were filtered and concentrated, dissolved again in 5 L of chlorobenzene, washed three times with an aqueous 5% solution of sodium hydroxide and once with 5% hydrogen chloride, neutralized by using an aqueous 7% solution of sodium bicarbonate and then washed twice with water. Subsequently, chlorobenzene was distilled off under a reduced pressure, so that 782 g of an oily blown product was obtained.

From the result of 1H-NMR and 31P-NMR measurement, elemental analysis for C, H, N, and measurement for the phosphorous content, it was confirmed that the oily brown product was a phosphazene compound having methoxy groups represented by the formula: $[N=P(OPh)_{0.98}(OC_6H_4\text{-}p\text{-}OCH_3)_{1.02}]n$ (a mixture of trimer: 29%, tetramer: 2%, pentamer and hexamer: 19%, heptamer: 6%, octamer and higher monomers: 44%; 46% of the octamer and the higher monomers was a linear dichlorophosphazene polymer having a weight-average molecular weight of about 10,000). Yield is 92.5%.

<Measurement and Evaluation>

Using the obtained test specimens, each of the following measurement and evaluation was carried out. Table 1 shows the result.

(Test Method for Impact Resistance)

ISO multi-purpose dumbbell test specimens subjected to notch fabrication were used and the Charpy impact strength was measured in the MD direction by a digital impact tester (DG-5, manufactured by Toyo Seiki Seisaku-sho Ltd.) under the conditions at an elevation angle of 150 degree, using a hammer of 2.0 J and at the number of measurement: n=10. In the Charpy impact strength, larger values show more excellent impact resistance. In the table, "N. B." in the column for the Charpy impact test means that test specimens were not cracked (Not Break).

(Test Method for Wet Heat Resistance)

ISO multi-purpose dumbbell test specimens subjected to notch fabrication were put in the conditions at 60° C. and 85% humidity condition, and the Charpy impact strength was measured on every hour.

◎: Charpy impact strength after 500 hours: 10 $kJ/m^2$ or more
○: Charpy impact strength after 500 hours: 5 $kJ/m^2$ or more and less than 10 $kJ/m^2$
Δ: Charpy impact strength after 500 hours: 1 $kJ/m_2$ or more and less than 5 $kJ/m^2$
x: Charpy impact strength after 500 hours: less than 1 $kJ/m^2$ (Test Method for Flame Retardancy)

UL test specimens for V test in UL-94 (1.6 mm thickness) were used and an UL-V test was carried out by the method of UL-94.

The result of the UL-V test shows that V-0 has the highest flame retardancy, V-1 has a high flame retardancy next to V-0, and V-2 has a high flame retardancy next to V-1. "not V" shows that the flame retardancy is inferior to V-2.

Comparative Examples 1, 2, and 3

Resin composition pellets were obtained in the same manner as in the examples from the compositions shown by Comparative Examples 1, 2, and 3 shown in Table 1, and injection molding and property evaluation were carried out. The results are shown in Table 2.

TABLE 1

| | Polylactic acid | | Phosphazene compound | | Ammonium polyphosphate | | Rubber and/ or thermoplastic elastomer | | Polyfunctional compound | | Antioxidant | Evaluation Wet heat resistance | Charpy impact strength before wet heat resistance ($Kj/m^2$) | Evaluation Flame retardancy |
|---|---|---|---|---|---|---|---|---|---|---|---|---|---|---|
| | Type | Part | Type | Part | Type | Part | Type | Part | Type | Part | Part | | | |
| Example 1 | A1 | 100 | B1 | 30 | — | — | C1 | 5 | D1 | 2 | 0.3 | ◎ | 35 | V2 |
| Example 2 | A1 | 100 | B2 | 35 | — | — | C2 | 3 | D1 | 2 | 0.3 | ◎ | 32 | V2 |
| Example 3 | A1 | 100 | B3 | 40 | — | — | C2 | 2 | D1 | 2 | 0.3 | ◎ | 15 | V1 |
| Example 4 | A2 | 100 | B1 | 50 | — | — | C1 | 10 | D1 | 0 | 0.3 | ○ | 45 | V1 |
| Example 5 | A1 | 100 | B1 | 30 | — | — | C2 | 1.5 | D1 | 2 | 0.3 | ○ | 10 | V2 |
| Example 6 | A1 | 100 | B4 | 30 | — | — | C1 | 5 | D1 | 0 | 0.3 | ○ | 30 | V2 |
| Example 7 | A1 | 100 | B1 | 50 | — | — | C1 | 5 | D1 | 1 | | ○ | 45 | V1 |
| Example 8 | A1 | 100 | B1 | 30 | — | — | C1 | 5 | D1 | 10 | 0.3 | ◎ | 25 | V2 |
| Example 9 | A1 | 100 | B6 | 30 | — | — | C1 | 5 | D1 | 2 | 0.3 | ◎ | 22 | V1 |
| Example 10 | A1 | 100 | B1 | 4 | — | — | C1 | 10 | D1 | 2 | 0.3 | Δ | 7 | V2 |
| Example 11 | A1 | 100 | B1 | 101 | — | — | C1 | 5 | D1 | 2 | 0.3 | ○ | N.B. | V0 |
| Example 12 | A1 | 100 | B1 | 45 | — | — | C1 | 0.5 | D1 | 0.05 | 0.3 | ○ | 15 | V2 |
| Example 13 | A1 | 100 | B1 | 25 | — | — | C1 | 5 | D1 | 5 | 1 | Δ | 13 | V2 |
| Comp. Example 1 | A1 | 100 | B1 | 40 | — | — | — | — | 2 | 2 | 0.3 | ◎ | 3 | V2 |
| Comp. Example 2 | A1 | 100 | — | — | B5 | 40 | C1 | 5 | 2 | 2 | 0.3 | x | 2 | V1 |
| Comp. Example 3 | A1 | 100 | — | — | — | — | C1 | 5 | 2 | 2 | 0.3 | x | 3 | Not V |

TABLE 2

| Symbol | Name of ingredient | Commercial name | Name of manufacturer | Remarks |
|---|---|---|---|---|
| A1 | Polylactic acid | TERRAMAC TE7000 | Unitika Ltd. | Clay contained by 1 mass part |
| A2 | Polylactic acid | TERRAMAC TE2000 | Unitika Ltd. | Clay not contained |
| B1 | Cyclic phenoxyphosphazene | FP-110 | Fushimi Pharmaceutical Co., Ltd. | — |
| B2 | Cyclic phenoxyphosphazene | SP-100 | Otsuka Chemical Co., Ltd. | — |
| B3 | Cyclic phenoxyphosphazene | SP-100H | Otsuka Chemical Co., Ltd. | — |
| B4 | Cyclic phenoxyphosphazene | FP-200 | Fushimi Pharmaceutical Co., Ltd. | — |
| B5 | Ammonium polyphosphate | AP422 | Clariant | — |
| B6 | Linear phenoxyphosphazene | Synthesized product | — | — |
| C1 | Thermoplastic elastomer | METABLEN SX-005 | Mitsubishi Rayon Co. Ltd. | — |
| C2 | Thermoplastic elastomer | METABLEN SRK200 | Mitsubishi Rayon Co. Ltd. | — |
| D1 | Carbodiimide compound | Carbodilite | Nisshinbo Chemical Inc. | — |
| — | Antioxidant | IRGANOX 1010 | Ciba Japan | — |

Application examples of the present invention include application to resin molded products such as electronic and electric instruments, domestic electric products, containers, and automobile interior materials.

While the present invention has been shown and described with reference to certain exemplary embodiments thereof, it will be understood by those skilled in the art that various changes modifications may be made therein without departing from the spirit and scope of the present invention as defined by the appended claims.

What is claimed is:

1. A resin composition comprising (A) a resin; (B) a phosphazene compound; and (C) a rubber,
   wherein (A) the resin consists of a polylactic acid, and
   when the resin composition is molded into a specimen, and a UL-V test is conducted according to a testing method of UL-94 (1.6 mm thickness) using the specimen, the result is V-2 or superior.

2. The resin composition according to claim 1,
   wherein (B) the phosphazene compound contains one selected from the group consisting of a cyclic phenoxy phosphazene, a linear phenoxy phosphazene and a phenoxy phosphazene.

3. The resin composition according to claim 1,
   wherein the content of (B) the phosphazene compound in the resin composition is 5 parts or more and 100 parts or less based on 100 parts of the polylactic acid.

4. The resin composition according to claim 1,
   wherein (C) the rubber contains one selected from the group consisting of a silicone-acryl blend rubber, an acryl rubber, a butadiene rubber and a natural rubber.

5. The resin composition according to claim 1,
   wherein the content of (C) the rubber in the resin composition is 0.1 parts or more and 20 parts or less based on 100 parts of the polylactic acid.

6. The resin composition according to claim 1, further comprising a polyfunctional compound.

7. The resin composition according to claim 6,
   wherein the polyfunctional compound contains one selected from the group consisting of a carbodiimide compound, a dicarboxylic acid compound, a diol compound, a hydroxyl carboxylic acid compound and an epoxy compound.

8. The resin composition according to claim 6,
   wherein the content of the polyfunctional compound in the resin composition is 0.1 parts or more and 10 parts or less based on 100 parts of the polylactic acid.

9. A resin molded product comprising a resin composition comprising (A) a resin, (B) a phosphazene compound, and (C) a rubber,
   wherein (A) the resin consists of a polylactic acid, and
   when the resin composition is molded into a specimen, and a UL-V test is conducted according to a testing method of UL-94 (1.6 mm thickness) using the specimen, the result is V-2 or superior.

10. The resin molded product according to claim 9,
    wherein (B) the phosphazene compound contains one selected from the group consisting of a cyclic phenoxy phosphazene, a linear phenoxy phosphazene and a phenoxy phosphazene.

11. The resin molded product according to claim 9,
    wherein the content of (B) the phosphazene compound in the resin composition is 5 parts or more and 100 parts or less based on 100 parts of the polylactic acid.

12. The resin molded product according to claim 9,
    wherein (C) the rubber contains one selected from the group consisting of a silicone-acryl blend rubber, an acryl rubber, a butadiene rubber and a natural rubber.

13. The resin molded product according to claim 9,
    wherein the content of (C) the rubber in the resin composition is 0.1 parts or more and 20 parts or less based on 100 parts of the polylactic acid.

14. The resin molded product according to claim 9, further comprising a polyfunctional compound.

15. The resin molded product according to claim 14,
    wherein the polyfunctional compound contains one selected from the group consisting of a carbodiimide compound, a dicarboxylic acid compound, a diol compound, a hydroxyl carboxylic acid compound and an epoxy compound.

16. The resin molded product according to claim 14,
    wherein the content of the polyfunctional compound in the resin composition is 0.1 parts or more and 10 parts or less based on 100 parts of the polylactic acid.

17. The resin molded product according to claim 14 which is a component of electronic and electric equipments.

* * * * *